US011490145B2

(12) United States Patent
Hosur

(10) Patent No.: US 11,490,145 B2
(45) Date of Patent: Nov. 1, 2022

(54) CONTENT INSERTION IN STREAMING MEDIA CONTENT

(71) Applicant: AT&T Intellectual Property I, L.P., Atlanta, GA (US)

(72) Inventor: Prabhudev Hosur, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/820,928

(22) Filed: Mar. 17, 2020

(65) Prior Publication Data

US 2020/0221151 A1 Jul. 9, 2020

Related U.S. Application Data

(63) Continuation of application No. 14/820,243, filed on Aug. 6, 2015, now Pat. No. 10,638,179.

(51) Int. Cl.
*H04N 21/258* (2011.01)
*H04L 67/02* (2022.01)
*H04N 21/234* (2011.01)
*H04N 21/81* (2011.01)
*H04N 21/61* (2011.01)
(Continued)

(52) U.S. Cl.
CPC ... *H04N 21/25883* (2013.01); *H04L 65/1089* (2013.01); *H04L 65/612* (2022.05); *H04L 65/613* (2022.05); *H04L 65/762* (2022.05); *H04L 67/02* (2013.01); *H04L 67/53* (2022.05); *H04N 21/23424* (2013.01); *H04N 21/25841* (2013.01); *H04N 21/6125* (2013.01); *H04N 21/812* (2013.01); *H04N 21/85406* (2013.01)

(58) Field of Classification Search
CPC ....... H04N 21/25883; H04N 21/23424; H04N 21/25841; H04N 21/6125; H04N 21/812; H04N 21/85406; H04L 65/1089; H04L 65/4084; H04L 65/4092; H04L 65/602; H04L 67/02; H04L 67/20
See application file for complete search history.

(56) References Cited

U.S. PATENT DOCUMENTS 7,984,466 B2   7/2011   Eldering et al.
8,032,649 B2  10/2011   Gupta et al.
(Continued)

FOREIGN PATENT DOCUMENTS

EP          2538629 A1   12/2012

OTHER PUBLICATIONS

Gerdfeldter, A. et al., "Setting the Future Media Services Architecture", Ericsson Review, Feb. 24, 2015.
(Continued)

*Primary Examiner* — Joshua D Taylor
(74) *Attorney, Agent, or Firm* — Guntin & Gust, PLC; Mark Wilinski

(57) ABSTRACT

A method includes accessing, at a media content provider system, a media stream corresponding to a first media content item. The method further includes generating a media content file based on the media stream and a second media content item that is different than the first media content item. A first portion of the media content file may include media data of the media stream, and a second portion of the media content file may include header data and an indicator of a location of the second media content item.

20 Claims, 6 Drawing Sheets

(51) Int. Cl.
*H04N 21/854* (2011.01)
*H04L 65/1089* (2022.01)
*H04L 65/612* (2022.01)
*H04L 65/613* (2022.01)
*H04L 65/75* (2022.01)
*H04L 67/53* (2022.01)

(56) References Cited

U.S. PATENT DOCUMENTS

| | | | |
|---|---|---|---|
| 8,489,760 B2 | 7/2013 | Visharam et al. | |
| 8,667,542 B1* | 3/2014 | Bertz | H04L 67/306 |
| | | | 725/62 |
| 8,676,952 B2 | 3/2014 | Reynolds et al. | |
| 8,752,113 B1 | 6/2014 | Good et al. | |
| 8,806,529 B2 | 8/2014 | Miles et al. | |
| 8,887,214 B1 | 11/2014 | Black et al. | |
| 8,887,215 B2 | 11/2014 | Fisher | |
| 8,948,249 B2 | 2/2015 | Sun et al. | |
| 2008/0114861 A1 | 5/2008 | Gildred | |
| 2010/0070996 A1 | 3/2010 | Liao et al. | |
| 2011/0119709 A1* | 5/2011 | Kim | H04N 13/183 |
| | | | 725/39 |
| 2011/0246661 A1 | 10/2011 | Manzari et al. | |
| 2012/0042091 A1 | 2/2012 | McCarthy et al. | |
| 2013/0006754 A1 | 1/2013 | Horvitz et al. | |
| 2013/0166765 A1 | 6/2013 | Kaufman | |
| 2013/0179589 A1 | 7/2013 | Mccarthy et al. | |
| 2013/0179590 A1 | 7/2013 | Mccarthy et al. | |
| 2013/0191550 A1* | 7/2013 | Hannuksela | H04N 21/2402 |
| | | | 709/231 |
| 2013/0290402 A1* | 10/2013 | Gavade | H04N 21/4586 |
| | | | 709/203 |
| 2014/0237525 A1* | 8/2014 | Rothschild | H04N 21/26613 |
| | | | 725/92 |
| 2014/0337903 A1 | 11/2014 | Zhu et al. | |
| 2014/0355625 A1 | 12/2014 | Chen et al. | |
| 2015/0088965 A1 | 3/2015 | Pakulski et al. | |
| 2015/0095948 A1* | 4/2015 | Kummer | H04N 21/6143 |
| | | | 725/35 |
| 2015/0120648 A1* | 4/2015 | Slovacek | G06F 16/41 |
| | | | 707/609 |
| 2015/0201227 A1* | 7/2015 | Krasko | H04N 21/8456 |
| | | | 725/34 |
| 2015/0358688 A1* | 12/2015 | Kummer | H04N 21/23424 |
| | | | 725/9 |

OTHER PUBLICATIONS

Islam, M., "A HTTP Streaming Video Server With Dynamic Advertising Splicing", Master of Science Thesis, Royal Institute of Technology (KTH), School of Information and Communication Technology, Mar. 21, 2010.

Kaur, M., "Low Latency Adaptive Media Streaming on PRRT", Master's Thesis in Computer Communication Technology, University of Saarland, Feb. 2015, 102 pages.

Krishnappa, D. et al., "Dashing Youtube: an Analysis of Using Dash in Youtube Video Service", IEEE 38th Conference on Local Computer Networks (LCN), 2013, pp. 407-415.

Yang, H. et al., "Opportunities and Challenges of HTTP Adaptive Streaming", International Journal of Future Generation Communication and Networking, vol. 7, No. 6, 2014, pp. 165-180.

\* cited by examiner

CONTENT INSERTION IN STREAMING MEDIA CONTENT

CROSS REFERENCE TO RELATED APPLICATIONS

This application is a continuation of U.S. patent application Ser. No. 14/820,243 filed Aug. 6, 2015. All sections of the aforementioned application are incorporated herein by reference in their entirety.

FIELD OF THE DISCLOSURE

The present disclosure is generally related to streaming of media content

BACKGROUND

Hypertext Transfer Protocol (HTTP)-based adaptive bitrate (ABR) streaming of media content is increasing in popularity as a method of providing media content to consumer devices because of an ability to use web-server infrastructure in the Internet and content delivery networks (CDNs) and because of support for ABR streaming by manufacturers of user devices. Insertion of advertisements into ABR streams of media content is becoming more attractive to content providers. One technique for advertisement insertion for ABR streaming of media content includes using splicers to splice advertisements into media content streams. However, using a splicer for advertisement insertion introduces additional hardware into a media content provider system and is associated with increased operational complexity and increased cost. Another technique for advertisement insertion for ABR streaming of media content includes use of a manifest manipulator to intercept a request from a user device and to provide a modified information file (referred to as a manifest file, a playlist file, or another file, depending on the ABR streaming protocol used to stream the media content) in response to intercepting the request. However, the use of a manifest manipulator for advertisement insertion may be incompatible with certain media streaming protocols.

DETAILED DESCRIPTION

Figure 1:
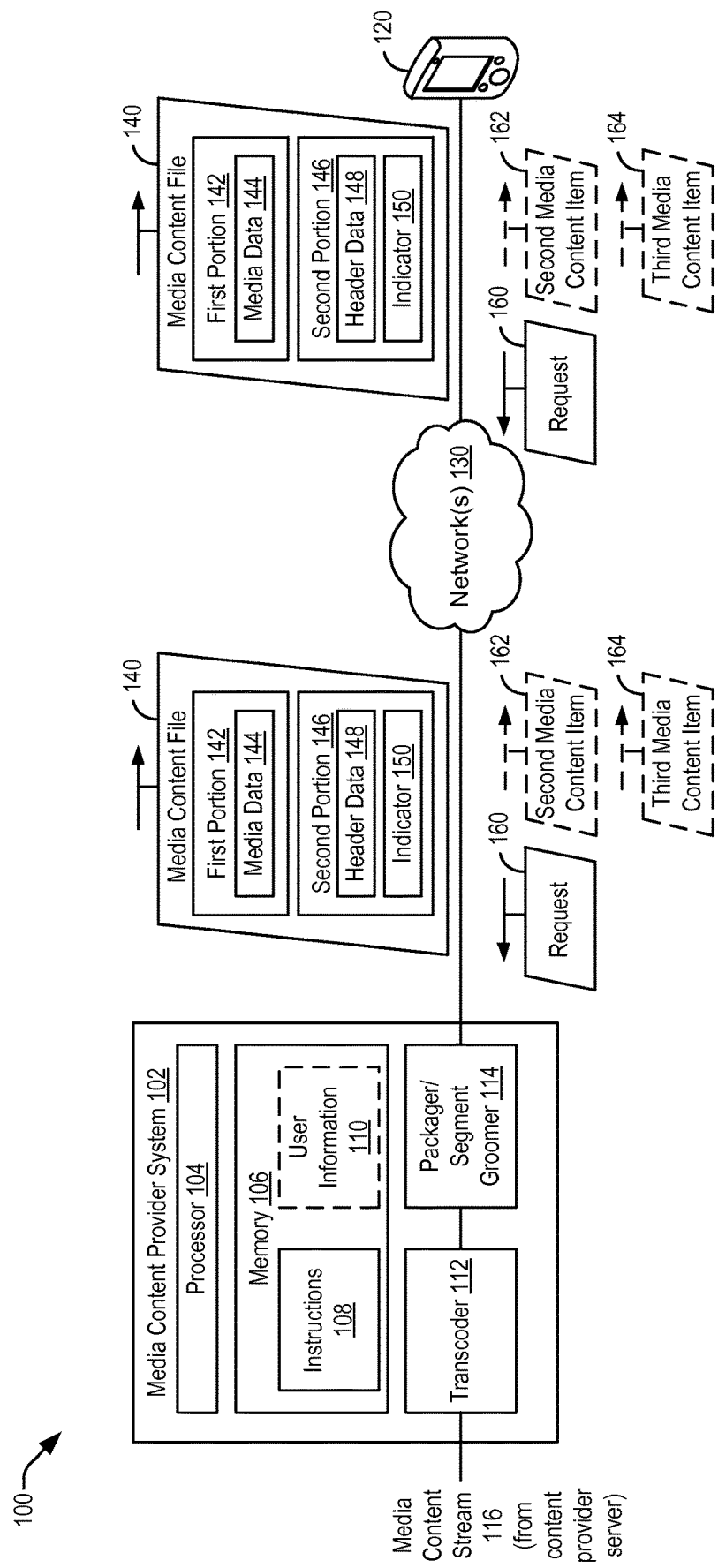
FIG. 1 is a block diagram of a particular embodiment of a system for providing a media content file including media data of a first media content item and an indicator of a second media content item.

A media content provider system may generate multiple content files based on program content and advertising content. The multiple media content files may be associated with different bitrates. The media content files may be streamed to client device(s) as part of a Hypertext Transfer Protocol (HTTP)-based adaptive bitrate (ABR) streaming process. The media content provider system may access (e.g., obtain) a media stream corresponding to a media content item. For example, a multi-bitrate (MBR) encoder or transcoder of the media content provider system may receive a particular media stream corresponding to a first media content item. As an example, the particular media stream may be received from a content provider server (e.g., a server of the content provider or a third party content provider). The MBR transcoder may generate multiple media streams based on the particular media stream. The multiple media streams may be associated with different bitrates. A packager/segment groomer of the media content provider system may receive the media streams and may use the media streams to perform segment-level advertisement insertion. The packager/segment groomer has less overhead than a splicer and thus reduces operational complexity and cost of the media content provider system as compared to using a splicer to perform advertisement insertion. Certain streaming protocols are associated with sending an information file to a client device a single time and are not compatible with providing modified or updated information files. For such protocols, the packager/segment groomer is configured to perform the advertisement insertion without modifying and re-transmitting an information file (e.g., without the need for modifying the information file). Additionally, the media content file generated by the packager/segment groomer is compatible with certain media streaming protocols for which the manifest manipulator is incompatible.

To illustrate, the media content provider system may access a media stream (of the multiple media streams) that corresponds to a first media content item. The media content provider system may select a second media content item (e.g., a different media content item) to be combined with media data of the media stream in a media content file. The first media content item may include program content (e.g., a streaming media content item or an on-demand media content item), and the second media content item may include advertising content. After selecting the second media content item, the media content provider system may generate the media content file based on the media stream and the second media content item. As an example, a first portion of the media content file may include media data of the media stream, and a second portion of the media content file may include header data and an indicator of a location of the second media content item. In a particular embodiment, the indicator is a uniform resource locator (URL) that indicates a location of the second media content item.

In a particular embodiment, the media content file has an International Organization for Standardization base media file format (ISO-BMFF). In other embodiments, the media content file has a protected interoperable file format (PIFF). An ISO-BMFF file may contain a number of discrete portions or units that are referred to as "boxes" or "atoms,"

as further described herein. Illustrative types of boxes that may be included in an ISO-BMFF file include a movie metadata box (a "moov" box), a movie fragment box (a "moof" box), a media data box (a "mdat" box), and a movie fragment random access box (a "mfra" box). The media data of the media stream (or a segment of the media stream) may be included in a first mdat box within a first moov box (e.g., a first portion) of the media content file. The indicator (e.g., a first URL) may be included in a moofbox within a second moov box (e.g., a second portion) of the media content file. Because the media file (e.g., media content file-A) includes media data and an indicator that references another media content file (e.g., media content file-B), the media content file (media content file-A) may be referred to as a "hybrid" ISO-BMFF file. Additionally, because the media content file includes moov boxes (e.g., the first portion or the second portion) that include either an mdat box (e.g., media data) or a moof box with header data and an indicator, the media content file may be formed in accordance with an ISO-based media file standard. Thus, the media content file may be compatible with client devices that operate in accordance with the ISO-based media file standard.

In a particular embodiment, the second portion (e.g., the second moov box) may include multiple indicators (e.g., multiple URLs) that indicate locations of multiple media content items. For example, the second portion may include the indicator (e.g., the first URL) that indicates a location of a second media content item, and the second portion may also include a second indicator (e.g., a second URL) that indicates a location of a third media content item. The second media content item and the third media content item may be associated with the same advertiser. To illustrate, the second media content item and the third media content item may be different advertisements for a particular product that are to be provided to devices in different geographic regions. In a particular embodiment, if the media content provider system receives a request for the second media content item from a client device, the media content provider system may determine whether to provide the second media content item or the third media content item based on user information associated with the client device. For example, the media content provider system may determine that the client device is in a geographic region associated with the second media content item, and the media content provider system may provide the second media content item based on the determination. In another particular embodiment, the client device that receives the media content file may determine whether to request the second media content item or the third media content item based user information associated with the client device.

By including indicators to additional media content (e.g., advertising content) in the media file, the media content provider system may perform segment-level advertisement insertion without manipulating an information file. Segment-level advertisement insertion may refer to inserting advertisements (or other media content) between segments of particular media content. For example, different segments of media content may be broken into chunks. After each chunk, the media file may include an indicator of a location of different advertising content. Thus, one media content file may be provided to a client device, and the client device may request the advertising content (or other content) based on indicators included in the media content file. Because the indicators are included in the media content file, an information file is not modified to indicate locations of the advertisements. Thus, advertisement insertion is performed without periodically transmitting an updated information file. For this reason, the media content file is compatible for use with media streaming protocols that send a single information file. For example, the media content file is compatible with the smooth streaming protocol, with ISO-BMFF-based streaming protocols, with DASH ISO-BMFF-based streaming protocols, and with PIFF-based streaming protocols, as non-limiting examples. Additionally, inserted advertisement content may be targeted (e.g., customized) based on user data (e.g., geographic information, demographic information, etc.) to a particular user of the client device based on user information. Targeted advertising may increase revenue to the media content provider.

In a particular embodiment, a method includes accessing, at a media content provider system, a media stream corresponding to a first media content item. The method further includes generating a media content file based on the media stream and a second media content item that is different than the first media content item. A first portion of the media content file may include media data of the media stream, and a second portion of the media content file may include header data and an indicator of a location of the second media content item.

In another particular embodiment, an apparatus includes a processor and a memory that is accessible to the processor. The memory includes instructions executable by the processor to perform operations. The operations include accessing a media stream corresponding to a first media content item. The operations further include generating a media content file based on the media stream and a second media content item that is different than the first media content item. A first portion of the media content file may include media data of the media stream, and a second portion of the media content file may include header data and an indicator of a location of the second media content item.

In another particular embodiment, a method includes receiving a media content file at a client device. The media content file may be based on a media stream corresponding to a first media content item and may be based on a second media content item that is different than the first media content item. A first portion of the media content file may include media data of the media stream. A second portion of the media content file may include header data and an indicator of a location of the second media content item. The method further includes sending a request for the second media content item to a media content provider system associated with the location of the second media content item.

FIG. 1 is a block diagram of a particular embodiment of a system 100 for providing a media content file including media data of a first media content item and an indicator of a second media content item. The system 100 includes a media content provider system 102. The media content provider system 102 may be a single device (e.g., a server) or multiple devices (e.g., multiple servers) configured in a distributed network environment. The media content provider system 102 includes a processor 104 (or multiple processors) and a memory 106 that is accessible to the processor 104. The memory 106 stores instructions 108 that are executable by the processor 104 to perform various operations, as further described herein. In some embodiments, the memory 106 may store user information 110, as further described herein. In other embodiments, the memory 106 does not store the user information 110, and the user information 110 is accessed via one or more external devices (e.g., one or more external servers or databases).

The system 100 may enable ABR streaming of media content to the client device 120. For example, the media content provider system 102 may be configured to generate media content files having different bit rates for use by the client device 120 during an ABR streaming process. The media content files include media data and indicators to other media content items, as further described herein. When the client device 120 receives a media content file, the client device 120 may begin processing the media content file and, in response to an indicator in the media content file, the client device 120 may request a referenced media content item. The media content provider system 102 may provide either the requested media content item, or in some embodiments a different media content item, based on the request, and the client device 120 may use the received media content item (e.g., the requested media content item or the different media content item), to initiate playback of advertising content during an ABR streaming process, as further described herein.

The media content provider system 102 may include a transcoder 112. The transcoder 112 may be configured to receive media content stream(s) and to generate media content streams associated with different bit rates, as further described herein. The media content provider system 102 may also include a packager/segment groomer 114. The packager/segment groomer 114 may be configured to package the media content streams from the transcoder 112 and to perform advertisement insertion, as further described herein. Although illustrated as separate components, in some embodiments, the processor 104 may be configured to execute the instructions 108 to perform the operations of the transcoder 112 and the packager/segment groomer 114. In other embodiments, the transcoder 112 and the packager/segment groomer 114 may include or correspond to dedicated circuitry, an application-specific integrated circuit (ASIC), a field-programmable gate array (FPGA) device, or other dedicated hardware configured to perform the operations of the transcoder 112 and the packager/segment groomer 114.

The system 100 also includes a client device 120. The client device 120 is associated with a user. The client device 120 may also be referred to as a media playback device. FIG. 1 illustrates an example in which the client device 120 is a phone. In other embodiments, the client device 120 may be a tablet computing device, a computerized watch, a personal digital assistant (PDA), a laptop computing device, a desktop computing device, a set-top box device, a television, a computerized component (e.g., a dashboard control display unit (CDU)) within a vehicle, or any other device capable of playing media content. The client device 120 may be configured to communicate with the media content provider system 102 via a network(s) 130. The network(s) 130 may include the Internet, a wired network, a local area network (LAN), a wide area network (WAN), a wireless network, a content delivery network, a cable network, a digital cable network, an internet protocol television (IPTV) network, a cellular telephone network, a satellite network, other networks, or a combination thereof. In a particular embodiment, the media content provider system 102 may be part of a cloud network.

The media content provider system 102 may be configured to receive streaming media content and to generate media content files. The media content files may be provided to the client device 120 for use in HTTP-based ABR streaming of media content. To illustrate, the media content provider system 102 may be configured to receive a media content stream 116 from a content provider server, as further described with reference to FIG. 3. The content provider server may belong to the same content provider as the media content provider system 102 or to a different content provider. In a particular embodiment, the media content stream 116 is a "live" stream. A live stream may correspond to media content that is not available in its entirety when a packet of the live stream is sent. To illustrate, a live stream may capture an event, such as a sporting event, a meeting, a concert, a performance, or other events, as non-limiting examples. Although referred to as "live," the stream may be delayed due to transmission, processing, regulations, or other reasons. In another embodiment, the media content stream 116 is a "video on demand" (VOD) stream. A VOD stream may be based on a media content item that is available in its entirety prior to transmission of the VOD stream. Although described as video content, the media content stream 116 may include video content, audio content, multimedia content, or a combination thereof.

ABR streaming refers to a process of transmitting media that enables a client device (e.g., the client device 120) to request different versions of a media content stream based on changing conditions at the client device or changing network conditions. For example, the client device 120 may initiate a HTTP-based ABR session to stream media content of a particular media item. The media content provider system 102 may be configured to provide multiple media content streams including multiple versions of the particular media content item. For example, the media content provider system 102 may provide multiple media content streams having different bit rates (e.g., a video bit rate and/or an audio bit rate). Each of the media content streams may be segmented into media content files representing a portion (e.g., a "chunk") of the media content stream. Locations of the media content files (e.g., at a server or at the media content provider system 102) are indicated by an information file (e.g., a manifest) that is provided to the client device 120. The client device 120 may be configured to determine a condition of the network(s) 130 (e.g., an available bandwidth or other measurement) and to select a media content file having a bit rate that does not exceed the available bandwidth (or a bit rate that does not exceed a bandwidth supported by available processing resources at the client device 120). The client device 120 may continue to stream media content files having the same bit rate until a condition of the network(s) 130 (or the client device 120) changes. In response to detecting the change in the network(s) 130 (or the client device 120), the client device 120 may be configured to continue performing ABR streaming by selecting media content files associated with a different bit rate. Each of the media content files may be processed by the client device 120 and used to playback the media content item corresponding to the media content files. For example, the client device 120 may initiate playback of media content included in a first media content file at a display of the client device 120. The display may be coupled to or integrated within the client device 120. After playback of the media content included in the first media content file is complete, the client device 120 may initiate playback of the media content included in a second media content file. The second media content file may include advertising content, as further described herein.

To further illustrate, the media content provider system 102 may be configured to receive the media content stream 116 at the transcoder 112. The transcoder 112 may be configured to transcode the media content stream 116 into multiple media content streams. The multiple media content streams may have different bit rates and may be associated with different encoder/decoders (CODECS). In some embodiments, the transcoder 112 may also be configured to segment each of the multiple media content streams into multiple segments (e.g., "chunks"). A segment (e.g., chunk or portion) may include a subset of frames of the media content stream, and chunks may have a fixed duration or variable durations. In some embodiments, a segmenter (not illustrated) may be configured to segment each of the multiple media content streams. In other embodiments, the packager/segment groomer 114 may be configured to segment the media content streams. The packager/segment groomer 114 may be configured to receive the multiple media content streams and to package the multiple media content streams into multiple media content files. For example, the packager/segment groomer 114 may be configured to generate a media file for each of the segments (e.g., chunks or portions) of each of the multiple media content streams. The media content files may be generated in accordance with a streaming media protocol. As non-limiting examples, the media content files may have an International Organization for Standardization base media file format (ISO-BMFF) or a protected interoperable file format (PIFF).

In addition to packaging the multiple media content streams, the packager/segment groomer 114 may be configured to insert references to additional content (and additional content) into the media content files. For example, the packager/segment groomer 114 may be configured to insert an indicator (that references a second media content item 162) into a first media content file that is generated based on a first media content stream (e.g., a first media content item) of the multiple media content streams. To illustrate, the packager/segment groomer 114 may be configured to generate a media content file 140 based on at least one segment of one of the multiple media content streams generated by the transcoder 112. In a particular embodiment, the first media content item may include program content, and the second media content item 162 may include advertising content. For example, the first media content item may include a segment of an event, such as a sporting event or a concert, and the second media content item 162 may include an advertisement to be displayed during the event. In other embodiments, the second media content item 162 may be any different media content item. For example, the second media content item 162 may include related programming content, a message (such as an alert or weather message), or other media content that is different than the first media content item.

A first portion 142 of the media content file 140 may include media data 144. The media data 144 may include media data of the first media content item (e.g., the at least one media content stream). A second portion 146 of the media content file 140 may include header data 148 and an indicator 150 of a location of a second media content item 162. The header data 148 may include data associated with the second media content item 162, such as data indicating a duration, a bit rate, a CODEC used to encode the second media content item 162, other information, or a combination thereof. The header data 148 may enable the client device 120 to process the second media content item 162 when the second media content item 162 is received so that playback of the media data 144 and the second media content item 162 appears to a user as playback of a single media content stream. Including the header data 148 and the indicator 150 in the second portion 146 of the media content file 140 may be referred to as "grooming" the media content file 140.

The indicator 150 may reference a location of the second media content item 162. In a particular embodiment, the indicator 150 may include a uniform resource locator (URL). The URL may indicate a location of the second media content item 162. For example, the URL may include an address of the second media content item 162, an address of a media content file that includes the second media content item 162, an address of a directory that includes the second media content item 162, an address of a server that stores the second media content item 162, or some other reference to a location of the second media content item 162. In a particular embodiment, the indicator 150 includes a URL that indicates a location of a media content file that contains the second media content item 162. In this embodiment, the media content file that contains the second media content item 162 may have an ISO-BMFF. In another particular embodiment, the indicator 150 includes a URL that indicates a partial file name of a second media content file. The second media content file may be stored in a directory that includes additional media content items associated with a particular advertiser that is associated with the second media content item 162, as further described herein.

Because the indicator 150 is included in the media content file 140, the media content file 140 may reference the second media content item 162 without containing media data of the second media content item 162. This method of content insertion (e.g., insertion of indicators that reference content) may be performed by the packager/segment groomer 114 without inserting media data of the second media content item 162 in the media content file 140. Because media data of the second media content item 162 is not inserted in the media content file 140, a splicer is not used to perform content insertion, which reduces complexity and cost of the media content provider system 102. Using indicators to perform advertisement insertion may enable dynamic advertisement replacement, as further described herein, for targeted advertisement.

The media content file 140 may be formed in accordance with an HTTP-based ABR streaming protocol. For example, the media content file may be formed in accordance with a smooth streaming protocol, an ISO-BMFF protocol, a PIFF protocol, or another protocol. The media content file 140 may include one or more "boxes" or "atoms" that store various information. Boxes or atoms may refer to one or more sub-elements or portions of the media content file, and may be defined by at least one ABR streaming protocol. Format of the media content file 140 is illustrated further herein with reference to FIG. 2. By including the indicator 150 in a box (e.g., a sub-element or a portion) within the media content file 140, the media content file 140 (and other media content files generated by the packager/segment groomer 114) may be compatible with one or more HTTP-based ABR streaming protocols. Thus, some streaming protocols (e.g., streaming protocols that are incompatible with content insertion performed by a manifest manipulator) may be compatible with content insertion performed by the media content provider system 102. For example, content insertion may be performed for an ISO-BMFF file or for a PIFF file.

The media content files (including the media content file 140) generated by packager/segment groomer 114 may be stored at a content server (not illustrated). The media content provider system 102 (e.g., a manifest generator of the media content provider system 102) may generate an information file (e.g., a manifest) for use in an ABR streaming process by the client device 120. The information file may identify each media content file generated by the packager/segment groomer 114, as well as a duration and a bit rate associated with each media content file. The information file may also indicate a location of each of the media content files (e.g., a location at a content server or at the media content provider system 102). When the client device 120 initiates an ABR streaming process, the client device 120 retrieves the information file (e.g., from the content server or the media content provider system 102). The client device 120 determines a condition of the network(s) 130 (and/or a condition of the client device 120), such as an available bandwidth, and the client device 120 selects media content files for streaming based on bit rates of the media content files and the available bandwidth. As an example, the client device 120 may select the media content file 140 for streaming based on a bit rate associated with the media content file not exceeding the available bandwidth. After receiving the media content file 140, the client device 120 may be configured to process the media content file 140 to identify the indicator 150 included (e.g., present) in the media content file 140. The client device 120 may be further configured to send a request 160 to the media content provider system 102 for the second media content item 162 based on the indicator 150. Because the media content file 140 includes the indicator 150, and not media data of the second media content item 162, the media content provided to the client device 120 may be selected by the media content provider system 102 at the time the request 160 is received, instead of at the time the media content file 140 is generated, as further described herein. Selecting the media content at the time the request 160 is received may enable targeted advertising, as further described herein.

The media content provider system 102 is configured to provide an additional media content item to the client device 120 in response to the request 160. In a particular embodiment, the media content provider system 102 provides the second media content item 162 in response to the request 160. This method may be referred to as "static content insertion," because insertion media content (e.g., the second media content item 162) is indicated in the media content file 140 and is provided to each client device that requests the insertion media content. Static content insertion may cause the same insertion media content (e.g., the second media content item 162) to be provided to each client device that retrieves the media content file 140. The client device 120 may be configured to playback the second media content item 162 at a display. To illustrate, the client device 120 may be configured to initiate playback of the media data 144 (of the first media content item) at the display. After completion of playback of the media data 144, the client device 120 may initiate playback of the second media content item 162. In a particular embodiment, the second media content item 162 may have a same bit rate and encoding properties as the media data 144. A user viewing the display may perceive an entirety of the media content (e.g., the program content and the advertisement content) as having a same quality level.

In an alternate embodiment, the media content provider system 102 may be configured to perform "dynamic content insertion." Dynamic content insertion refers to providing insertion media content based on the user information 110 at the time insertion of media content is requested by the client device 120. Dynamic content insertion may cause different insertion media content to be provided to different client devices that retrieve the media content file 140 based on user information corresponding to the client devices. For example, the client device 120 may send the request 160 for the second media content item 162 based on the indicator 150 in the media content file 140. The media content provider system 102 may be configured to determine whether to provide the second media content item 162 or another media content item based on the user information 110 and information associated with the media content items. The user information 110 may include geographic information, demographic information (e.g., an age of a user, an income of a user, and/or other demographic information), purchasing information (e.g., items purchased by a user, categories of purchased items, predicted purchases, etc.), or a combination thereof.

In a particular embodiment, the user information 110 may be based on a user profile stored at a server (not illustrated). For example, a user may answer questions (using the client device) and a user profile that indicates the user information 110 may be generated. Additionally or alternatively, the user information 110 may be generated based on data associated with the user. For example, an information server may be configured to determine information associated with customers (e.g., users) of the media content provider. The media content provider system 102 may be configured to access the server to retrieve the user information 110. In some embodiments, the user information 110 may be stored at the media content provider system 102 (or the media content provider system 102 may include a user information server). In other embodiments, the client device 120 may provide the user information 110 to the media content provider system 102 when the client device 120 requests an information file (e.g., a manifest) for use during ABR streaming of media content.

To illustrate, the second media content item 162 may be associated with a first geographic region and a third media content item 164 may be associated with a second geographic region that is different than the first geographic region. The media content provider system 102 may be configured to determine whether to provide the second media content item 162 or the third media content item 164 based on a geographic region indicated by the user information 110. For example, if the user information 110 indicates that the client device 120 is associated with the first geographic region, the media content provider system 102 may provide the second media content item 162 to the client device 120. If the user information 110 indicates that the client device 120 is associated with the second geographic region, the media content provider system 102 may provide the third media content item 164 to the client device 120. In other embodiments, the determination of which media content item to provide may be based on other information, such as demographic information (e.g., an advertisement for a more expensive product may be provided if an income of the user is above a threshold), purchasing information (e.g., an advertisement for a diet soft drink may be provided if the user has previously purchased other diet soft drinks), or other information.

In a particular embodiment, the indicator 150 may include a URL that indicates a partial file name of a second media content file that includes the second media content item 162. The second media content file may be stored in a directory that includes additional media content items associated with a particular advertiser that is associated with the second media content item. For example, multiple media content files associated with advertisements for a particular soft drink company may be stored in common directory. The partial file name may indicate a part of a file name that is common to each of the media content files. To illustrate, the URL may indicate a partial file name "soft_drink_ad.ds". The client device 120 may include the partial file name in the request 160, and receiving the partial file name may cause the media content provider system 102 to perform dynamic content insertion. For example, the media content provider system 102 may determine whether to provide a media content file with the file name "soft_drink_ad_-1.ds" (e.g., a file that includes the second media content item 162) or a media content file with the file name "soft_drink_ad-2.ds" (e.g., a file that includes the third media content item 164), as a non-limiting example. The determination may be based on geographic regions associated with the media content files and the client device 120 (as described above), or based on other information included in the user information 110, as described above. In this manner, receiving a partial file name in the request 160 may trigger performance of dynamic content insertion at the media content provider system 102. In other embodiments, the media content provider system 102 may be configured to perform dynamic content insertion if there are multiple media content items associated with a particular advertiser that are stored in a common directory. The media content provider system 102 may be configured to perform static content insertion if there is a single media content item (e.g., the second media content item 162) associated with the particular advertiser.

In a particular embodiment, the user information 110 may be stored at the media content provider system 102. In this embodiment, the media content provider system 102 may determine a particular media content item to provide to the client device 120 in response to the request 160. In another particular embodiment, the media content provider system 102 may be configured to access another system, such as an advertisement decision server, to determine the particular media content item to provide, as further described with reference to FIG. 3. In a particular embodiment, the insertion media content (e.g., the second media content item 162 and the third media content item 164) may be stored at the media content provider system 102. In an alternate embodiment, the insertion media content may be stored at an external system or device, such as a third party advertising server, as further described with reference to FIG. 3.

In a particular embodiment, the second portion 146 of the media content file 140 may also include a second indicator that indicates a location of the third media content item 164. In this embodiment, the media content provider system 102 may send information associated with the second media content item 162 and the third media content item 164 to the client device 120. As one example, the information may be included in the header data 148. As another example, the information may be sent as a separate message. The information may indicate geographic regions associated with the second media content item 162 and the third media content item 164, age ranges associated with the second media content item 162 and the third media content item 164, products associated with the second media content item 162 and the third media content item 164, or other information, as non-limiting examples. The client device 120 may be configured to determine, based on the information associated with the second media content item 162 and the third media content item 164 and based on user information associated with a user of the client device 120, whether to request the second media content item 162 or the third media content item 164.

During operation, the media content provider system 102 receives the media content stream 116 at the transcoder 112. The transcoder 112 performs encoding and/or transcoding operations on the media content stream 116 to generate multiple media content streams having different bit rates. For example, the transcoder 112 may generate a first media content stream having a first bit rate, a second media content stream having a second bit rate that is higher than the first bit rate, and a third media content stream having a third bit rate that is higher than the third bit rate. Although three media content streams are described, in other embodiments, the transcoder 112 may generate more than three or fewer than three media content streams. In some embodiments, the transcoder 112 may also segment the media content streams into multiple segments (e.g., "chunks"). In other embodiments, segmenting the media content streams may be performed by a segmenter (not illustrated) or at the packager/segment groomer 114.

The packager/segment groomer 114 may generate the media content file 140 based on a segment of one of the media content streams generated by the transcoder 112. The packager/segment groomer 114 may generate other media content files based on the other segments and the other media content streams. The media content file 140 may include the first portion 142 that includes the media data 144. The media content file 140 may also include the second portion 146 that includes the header data 148 and the indicator 150. The header data 148 may include information to enable the client device 120 to perform pre-processing on the media content file 140, including the second portion 146 that corresponds to the second media content item 162, even though the second media content item 162 is not included in the media content file 140. The header data 148 may include fragment header information and track information (e.g., video track, audio track, or both), as further described with reference to FIG. 2. After being generated, the media content file 140 and the other media content files may be stored at a content server until being requested by the client device 120. Additionally, an information file (e.g., a manifest) that indicates the locations of the media content files may be generated and stored at the content server.

When the client device 120 initiates performance of ABR streaming, the client device 120 may request the information file (e.g., the manifest). The client device 120 may also determine a condition of the network(s) 130. For example, the client device 120 may determine a bandwidth available at the client device 120. Based on the available bandwidth, the client device 120 requests media content files (including the media content file 140) associated with a particular bit rate. For example, the client device 120 may determine particular media content files indicated in the information file that have a bandwidth that is within the available bandwidth, and the client device 120 may request the particular media content files. The media content provider system 102 (or a server that stores the media content items) may send the requested media content files to the client device 120. Based on processing the indicator 150 in media content file 140, the client device 120 may send the request 160 for the second media content item 162 to the media content provider system 102. The media content provider system 102 may provide the second media content item 162 or the third media content item 164 to the client device 120 in response to the request 160. As an example, the media content provider system 102 may perform static content insertion and may provide the second media content item 162 to the client device 120.

As another example, the media content provider system 102 may perform dynamic content insertion and may provide either the second media content item 162 or the third media content item 164 to the client device 120 based on the user information 110. For example, the media content provider system 102 may select either the second media content item 162 or the third media content item 164 based on geographic regions associated with the second media content item 162 and the third media content item 164 and a geographic region indicated by the user information 110, as described above. As another example, the media content provider system 102 may select either the second media content item 162 or the third media content item 164 based on product types (e.g., a soft drink or a diet soft drink) associated with the second media content item 162 and the third media content item 164 and purchasing information indicated by the user information 110, as described above. Dynamic content insertion may provide advertising that is targeted to a user of the client device 120.

Thus, FIG. 1 illustrates an example of a system of generating media content files that include media content data associated with a first media content item (e.g., a segment of a media content stream) and header data and an indicator that references a second media content item. The media content files may be retrieved by the client device 120 during an ABR streaming process performed at the client device 120. When the client device 120 receives a media content file, the client device 120 requests the inserted content referenced by the indicator. By including an indicator that references the second media content item, the media content provider system 102 performs content insertion in the media content file without inserting media data of the second media content item into the media content file. Because media data of the second media content item is not inserted in the media content file, a splicer is not used, which reduces complexity and cost of the media content provider system 102. Additionally, the content insertion is performed without modifying an information file (e.g., a manifest). Thus, the media content files generated by the media content provider system 102 may be compatible with streaming file protocols that are incompatible with a manifest manipulator. FIG. 1 further illustrates that the media content provider system 102 may perform static content insertion or dynamic content insertion by determining a particular media content item to provide to the client device 120 in response to a request. Dynamic content insertion may enable targeted advertising, which may increase revenue for a media content provider.

Figure 2:
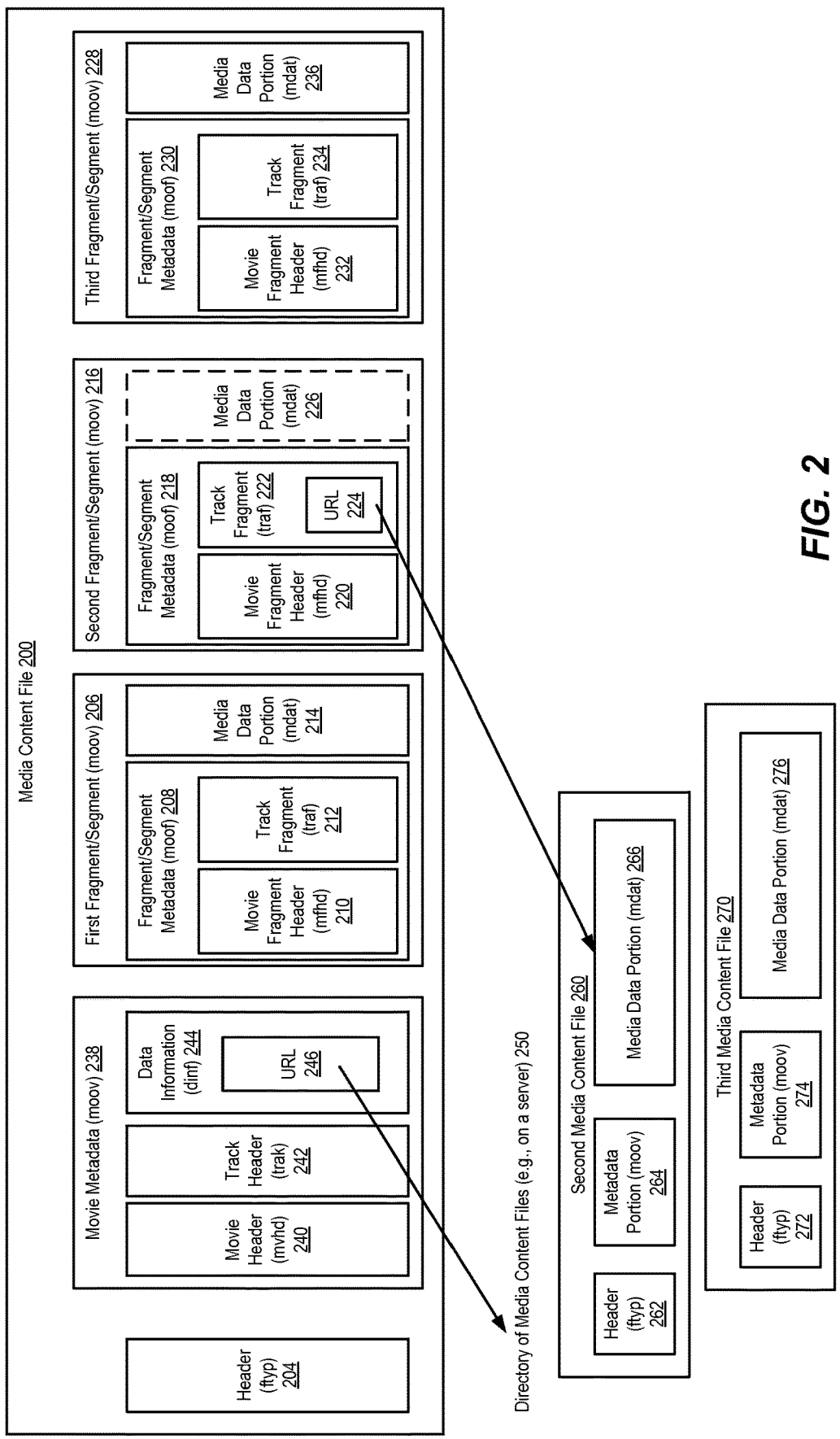
FIG. 2 is a block diagram illustrating a particular embodiment of a media content file including media data of a first media content item and an indicator of a second media content item.

Referring to FIG. 2, a block diagram illustrating a particular embodiment of a media content file including media data of a first media content item and an indicator of a second media content item is depicted and generally designated 200. The media content file 200 may be used during an ABR streaming process at a client device. In a particular embodiment, the media content file 200 may include or correspond to the media content file 140 of FIG. 1. The media content file 200 illustrated in FIG. 2 may include an ISO-BMFF file. In other embodiments, the media content file 200 may include a PIFF file or a different file type.

The media content file 200 includes multiple "boxes" or "atoms" that include information and/or media data. Illustrative types of boxes that may be included in an ISO-BMFF file include a movie header box (a "moov" box), a movie fragment box (a "moof" box), a media data box (a "mdat" box), a movie fragment random access box (a "mfra" box), or a file type box (a "ftyp" box). At least one or more of the boxes (or atoms) may include multiple boxes (or multiple atoms), such as a movie header box (a "mvhd" box), a track header box (a "trak" box), a movie fragment, a data information box (a "dinf" box), a movie fragment header box (a "mfhd" box), and a track fragment box (a "traf" box). At least one of the boxes includes media data ("mdat"), and at least one of the boxes includes a URL (e.g., an indicator) to other media content.

As illustrated in FIG. 2, the media content file 200 includes a header 204, movie metadata 238, a first fragment 206, a second fragment 216, and a third fragment 228. The media content file 200 illustrated in FIG. 2 is for illustrative purposes and is not limiting. In other embodiments, media content files may have different aspects than illustrated in FIG. 2. The header 204 may include a file type (ftyp) box. The ftyp box may identify a type of the media content file and may indicate compatibility information. For example, the ftyp box may identify the media content file 200 as having an ISO-BMFF.

The first fragment 206 may include a movie header (moov) box that includes information and media data corresponding to a segment of a media content stream of a first media content item. The first fragment 206 may include or correspond to the first portion 142 of the media content file 140 of FIG. 1. The first fragment 206 may include a first movie fragment (moof) box 208 that includes first header data (e.g., a first movie fragment header (mfhd) box 210 and a first track fragment (traf) box 212). The first mfhd box 210 may include header information associated with the media data included in the first fragment 206, and the first traf box 212 may include track information (e.g., audio track information, video track information, or both) associated with the media data included in the first fragment 206. The first fragment 206 also includes a first media data (mdat) portion 214. The first mdat portion 214 may include media data corresponding to a first media content item. For example, the first mdat portion 214 may include media data corresponding to a segment of a media stream generated by the transcoder 112 of FIG. 1. The first mdat portion 214 may include or correspond to the media data 144 of FIG. 1.

The second fragment 216 may include a moov box that includes information and an indicator corresponding to a second media content item. The second fragment 216 may include or correspond to the second portion 146 of the media content file 140 of FIG. 1. The second fragment 216 may include a second moof box 218 that includes second header data (e.g., a second mfhd box 220 and a second traf box 222). The second header data may include or correspond to the header data 148 of FIG. 1. The second mfhd box 220 may include header information associated with the second media content item, and the second traf box 222 may include track information associated with the second media content item. The second traf box 222 includes an indicator (e.g., a uniform resource locator (URL) 224). The URL 224 may include or correspond to the indicator 150 of FIG. 1. The URL 224 may indicate a location of a second media content file 260. The second media content file 260 may include the second media content item. The second media content file 260 may include a header 262 (e.g., a ftyp box), a metadata portion 264 (e.g., a moov box), and a media data portion 266 (e.g., a mdat portion). The mdat portion 266 may include media data of the second media content item. In a particular embodiment, the URL 224 may indicate a location of the second media content file 260, such as a location at a server, a location in a directory, etc. For example, the URL 224 may indicate a location of the second media content file 260 within a directory 250 of media content files. The URL 224 may also indicate a file name of the second media content file 260.

In another particular embodiment, the URL 224 may include a partial file name of the second media content file 260, as described with reference to FIG. 1. In another particular implementation, the second traf box 222 includes a different indicator, such as a pointer that points to the mdat portion 266, instead of the URL 224. The different indicator (e.g., the pointer) may correspond to the indicator 150 of FIG. 1. In some embodiments, the second fragment 216 also includes a second mdat portion 226. The second mdat portion 226 may include media data that is different than the first media content item and the second media content item.

For example, the second mdat portion 226 may include media data corresponding to a "default" advertisement. In this embodiment, if the client device 120 of FIG. 1 does not receive a media content item in response to sending the request 160 (e.g., due to an error or problem at the media content provider system 102 or the network(s) 130), the client device 120 may initiate playback of the second mdat portion 226 (e.g., instead of the second media content item 162). The second mdat portion 226 may be referred to as default advertising content because playback of the second mdat portion 226 occurs if reception and playback of other media content (e.g., targeted advertising) is unavailable.

The third fragment 228 may include a moov box that includes information and media data. The third fragment 228 may include a third moof box 230 that includes third header data (e.g., a third mfhd box 232 and a third trafbox 234). The third mfhd box 232 may include header information associated with the media data included in the third fragment 228, and the third traf box 234 may include track information associated with the media data included in the third fragment 228. The third fragment 228 also includes a third mdat portion 236. The third mdat portion 236 may include media data corresponding to the first media content item. For example, the third mdat portion 236 may include media data corresponding to a different segment of the media stream associated with the first mdat portion 214.

The movie metadata 238 may include a moov box that includes information and an indicator of a location of a directory that stores the second media content item. The movie metadata 238 may include a movie header (mvhd) box 240 and a track header (trak) box 242. The mvhd box 240 may include header information associated with the first media content item as a whole, and the track header box 242 may include track information associated with the first media content item as a whole. The movie metadata 238 may also include a data information (dinf) box 244. The dinf box may include a second indicator that indicates a directory that stores at least the second media content item. The indicator may be a second URL 246 that indicates a location of the directory 250. The directory 250 may store the second media content file 260 and a third media content file 270. The third media content file 270 may include a header 272 (e.g., a ftyp box), a metadata portion 274 (e.g., a moov box), and a media data portion 276 (e.g., a mdat portion). The second media content file 260 and the third media content file 270 may be associated with a particular advertiser or a particular product. In a particular embodiment, the second media content file 260 and the third media content file 270 may include or correspond to the second media content item 162 and the third media content item 164 of FIG. 1, respectively. As described with reference to FIG. 1, a media content provider system may determine whether to provide the second media content file 260 or the third media content file 270 to a client device when performing dynamic content insertion. For example, the media content provider system 102 of FIG. 1 may determine whether to provide the second media content file 260 (corresponding to the second media content item 162) or the third media content file 270 (corresponding to the third media content item 164) based on information associated with the second media content file 260 and the third media content file 270 and based on the user information 110 of FIG. 1. Selecting a particular media content item based on the user information 110 may enable targeted advertising, as described with reference to FIG. 1.

Thus, FIG. 2 illustrates a media content file 200 that includes media content data of a first media content item in a first portion (e.g., the first fragment 206) and an indicator that references a second media content item in a second portion (e.g., the second fragment 216). Because the media content file 200 includes media data and an indicator that references another media content file, the media content file 200 may be referred to as a "hybrid" ISO-BMFF file.

Figure 3:
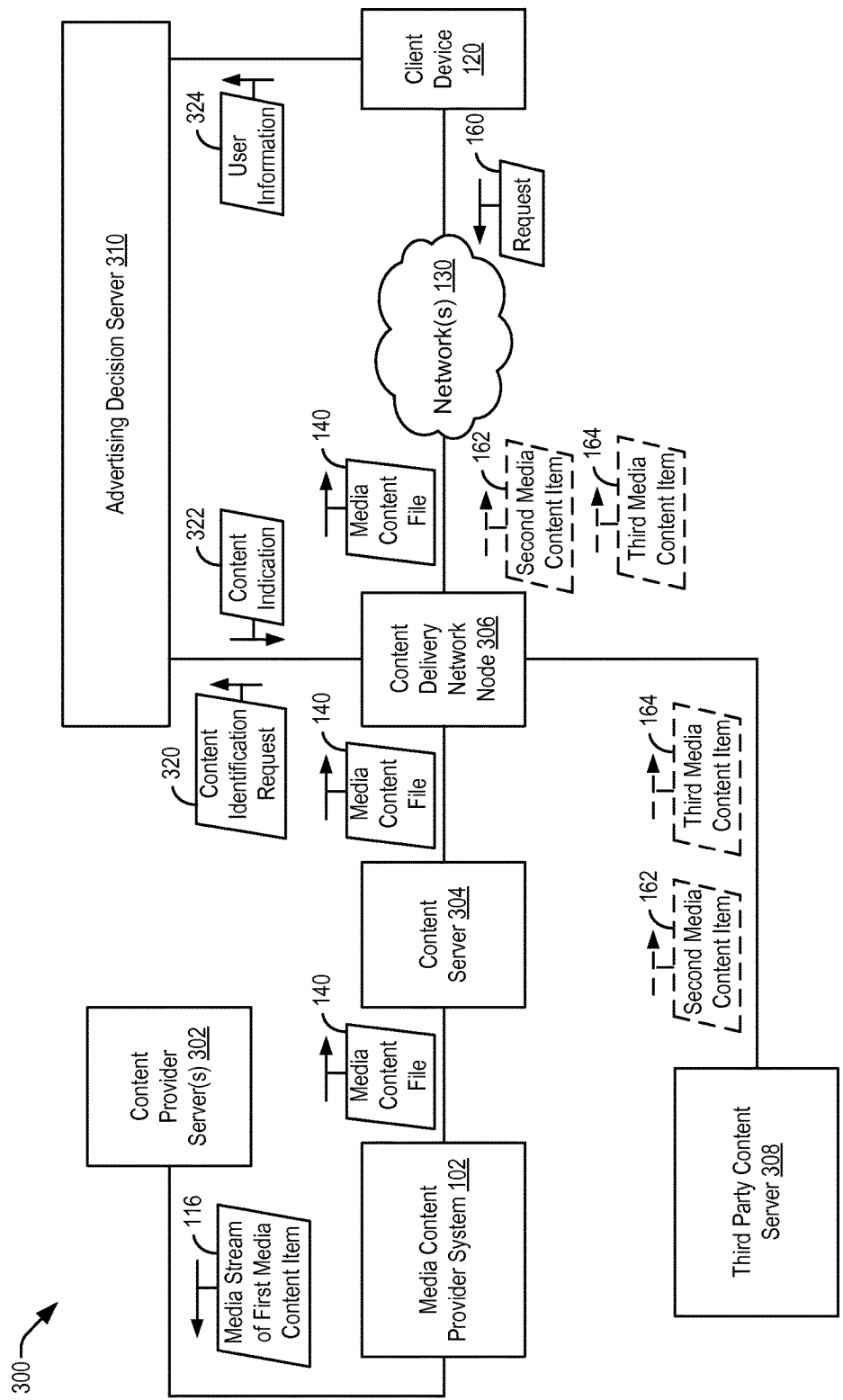
FIG. 3 is a block diagram illustrating additional details and components of a particular embodiment of the system 100 of FIG. 1.

Referring to FIG. 3, a block diagram of a system illustrating additional details and components of a particular embodiment of the system 100 of FIG. 1 is depicted and generally designated 300. The system 300 may include the media content provider system 102, the network(s) 130, and the client device 120 of FIG. 1, as well as additional components.

As illustrated in FIG. 3, the system 300 includes a content provider server(s) 302, a content server 304, a content delivery network (CDN) node 306, a third party content server 308, and an advertising decision server 310. The content provider sever(s) 302 may include a server (or multiple servers) that stores media content for streaming. The content provider server(s) 302 may also include media capture device(s) that capture media content for use in media streaming. The content providers may be associated with the particular media content provider that owns the media content provider system 102. Alternatively, the content provider server(s) 302 may be associated with different content providers. The media content provider system 102 may be configured to receive the media content stream 116 from the content provider server(s) 302. As described with reference to FIG. 1, the media content stream 116 may include video and/or audio content of a first media content item, such as a live event.

The media content provider system 102 may be configured to generate the media content file 140 based on the media content stream 116. Details of the process of generating the media content file 140 are described with reference to FIG. 1. Although a single media content file 140 is illustrated, such illustration is for convenience, and the media content provider system 102 may generate multiple media content files based on the media content stream 116. As described with reference to FIG. 1, each of the media content files may correspond to a segment of one of multiple media content streams generated by the media content provider system 102. Additionally, some of the media content files may be associated with different bit rates. The content server 304 may be configured to store the media content files (including the media content file 140). For example, the content server 304 may include a database of media content files for use in ABR streaming to client devices. The CDN node 306 may be configured to facilitate ABR streaming to client devices. For example, the CDN node 306 may be configured to provide an information file (e.g., a manifest) to the client device 120 in response to the client device 120 initiating an ABR streaming session for the first media content item. Additionally, the CDN node 306 may be configured to retrieve media content files (e.g., the media content file 140) from the content server 304 or from other locations (e.g., the third party content server 308) and to provide the media content files to the client device 120 during the ABR streaming session. Although the media content provider system 102, the content server 304, and the CDN node 306 are illustrated in FIG. 3 as separate components, in other embodiments, the media content provider system 102 may include, or may be configured to perform the operations of, the content server 304 and the CDN node 306.

After the client device 120 initiates an ABR streaming session and receives the information file, the client device 120 may select media content files associated with a particular bit rate for streaming. For example, the client device 120 may select the media content file 140 based on a bit rate associated with the media content file 140 not exceeding an available bandwidth at the client device 120. As described with reference to FIG. 1, the media content file 140 may include media data associated with the first media content item and an indicator that indicates a location of the second media content item 162. In response to the indicator, the client device 120 may send the request 160 to the media content provider system 102. The CDN node 306 may be configured to receive the request 160 and to determine a particular media content item to provide to the client device 120 based on the request 160.

In a particular implementation, the CDN node 306 may be configured to perform static content insertion based on the request 160, as described with reference to FIG. 1. For example, if the request 160 indicates the second media content item 162 (e.g., if the indicator includes a file name of the second media content item 162), the CDN node 306 may be configured to provide the second media content item 162 to the client device 120. In some implementations, the second media content item 162 may be advertising media content associated with a third party and may be stored at the third party content server 308. In this embodiment, the CDN node 306 may retrieve the second media content item 162 from the third party content server 308 and provide the second media content item 162 to the client device 120. In an alternate embodiment (not illustrated), the second media content item 162 may be stored at the content server 304, and the CDN node 306 may retrieve the second media content item 162 from the content server 304.

In another particular implementation, the CDN node 306 may be configured to perform dynamic content insertion based on the request 160, as described with reference to FIG. 1. In a particular embodiment, if the indicator in the media content file 140 indicates a partial file name of the second media content item 162, the request 160 that is generated by the client device 120 also includes the partial file name. In response to receiving the request 160 containing the partial file name, the CDN node 306 may be configured to perform dynamic content insertion. In other embodiments, the CDN node 306 may be configured to perform dynamic content insertion if the media content item (e.g., the second media content item 162) indicated by the request 160 is stored in a directory with other media content items. For example, the second media content item 162 may be an advertisement and may be associated with other versions, other advertisements for the same product, and/or other advertisements for the same advertiser, as non-limiting examples, that are stored in a common directory. The CDN node 306 may select one of the media content items from the directory as part of the dynamic content insertion process.

To perform dynamic content insertion, the CDN node 306 may be configured to access the advertising decision server 310. For example, the CDN node 306 may be configured to send a content identification request 320 to the advertising decision server 310 in response to receiving the request 160. The content identification request 320 may indicate the media content item in the request 160 (e.g., the second media content item 162) and an identifier of the client device 120. The advertising decision server 310 may be configured to receive content identification requests and to determine a particular media content item to be provided to the client device 120. The determination may be based on user data associated with the client device 120. For example, the advertising decision server 310 may be configured to receive user information 324 from the client device 120. The user information 324 may be the same information as the user information 110 of FIG. 1. For example, the user information 324 may include geographic information, demographic information, purchasing information, other information, or a combination thereof. The advertising decision server 310 may be configured to store the user information 110 after receiving the user information 324 from the client device 120.

The advertising decision server 310 may be configured to determine a particular media content item (e.g., the second media content item 162 or the third media content item 164) to be provided to the client device 120 based on the content identification request 320 and the user information 324. As an example, the second media content item 162 and the third media content item 164 may be associated with different geographic regions, and the advertisement decision server 310 may determine whether to provide the second media content item 162 or the third media content item 164 based on a geographic region indicated by the user information 324. As another example, the second media content item 162 may be associated with an advertisement for soft drinks, the third media content item 164 may be associated with an advertisement for beer, and the advertisement decision server 310 may determine whether to provide the second media content item 162 or the third media content item 164 based on an age of a user indicated by the user information 324. As another example, the second media content item 162 may be associated with an advertisement for a soft drink, the third media content item 164 may be associated with an advertisement for a diet soft drink, and the advertisement decision server 310 may determine whether to provide the second media content item 162 or the third media content item 164 based on whether a user of the client device 120 has purchased diet soft drinks (as indicated by purchasing information included in the user information 324.

After determining a particular media content item (e.g., the second media content item 162 or the third media content item 164) to be provided to the client device 120, the advertising decision server 310 may send a content indication 322 to the CDN node 306. The content indication 322 may indicate the particular media content item to be provided to the client device 120. The CDN node 306 may be configured to retrieve and provide either the second media content item 162 or the third media content item 164 based on the content indication 322. The client device 120 may be configured to receive the media content item (either the second media content item 162 or the third media content item 164) and may initiate playback of the media content item, as described with reference to FIG. 1.

Thus, FIG. 3 illustrates an example of a system of generating media content files that include media content data associated with a first media content item (e.g., a segment of a media content stream) and header data and an indicator that references a second media content item. The media content files may be used during an ABR streaming process performed at the client device 120. The system of FIG. 3 enables generation of the media content files without using a splicer or a manifest manipulator. Additionally, the advertising decision server 310 may be used to perform dynamic content insertion, which may enable targeted advertising.

Figure 4:
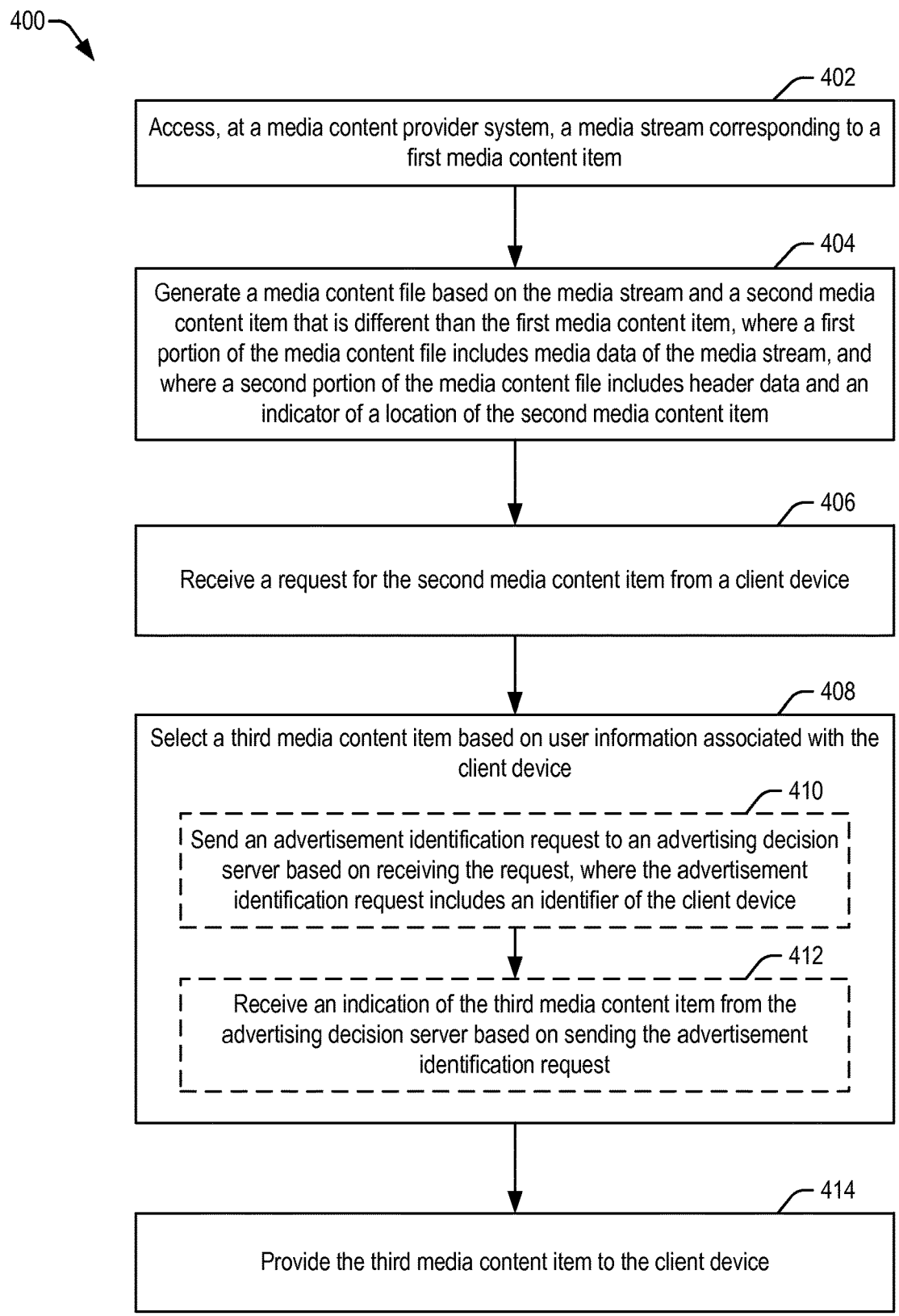
FIG. 4 is a flowchart of an illustrative embodiment of a method of generating a media content file including media data of a first media content item and an indicator of a second media content item.

Referring to FIG. 4, a particular illustrative example of a method of generating a media content file including media data of a first media content item and an indicator of a second media content item is depicted and generally designated 400. The method 400 may be performed at one or more devices of a content delivery network (CDN) of a media content provider. As an illustrative, non-limiting example, the method 400 may be performed by the media content provider system 102 of FIGS. 1 and 3.

The method 400 may include accessing, at a media content provider system, a media stream corresponding to a first media content item, at 402. For example, the media content stream 116 may be received at the transcoder 112 of the media content provider system 102, and the transcoder 112 may generate multiple media content streams having different bit rates. The method 400 may further include generating a media content file based on the media stream and a second media content item that is different than the first media content item. A first portion of the media content file may include media data of the media stream, and a second portion of the media content file may include header data and an indicator of a location of the second media content item. For example, the packager/segment groomer 114 may generate the media content file 140. The media content file 140 may include the first portion 142 that includes the media data 144 (e.g., media data associated with a first media content item). The media content file 140 may also include the second portion 146 that includes the header data 148 and the indicator 150. The first media content item may include program content, and the second media content item may include advertising content. In a particular embodiment, the media content file has an International Organization for Standardization base media file format (ISO-BMFF). In another particular embodiment, the media content file has a protected interoperable file format (PIFF).

In a particular embodiment, the method 400 further includes receiving the media stream from a content provider server at a transcoder of the media content provider system. For example, the media content stream 116 may be received at the transcoder 112. The media content stream 116 may be received from the content provider server(s) 302 of FIG. 3.

In a particular embodiment, the indicator includes a uniform resource locator. For example, the indicator 150 may include or correspond to the URL 224 of FIG. 2. The URL may indicate a location of a second media content file that contains the second media content item, and the second media content file may have an International Organization for Standardization base media file format. For example, the URL 224 may indicate a location of the second media content file 260. Alternatively, the URL may indicate a partial file name of a second media content file, and the second media content file may be stored in a directory that includes additional media content items associated with a particular advertiser that is associated with the second media content item. For example, the URL 224 may indicate a partial file name of the second media content file 260. The second media content file 260 may be stored in the directory 250 that also includes the third media content file 270. In a particular embodiment, the additional media content items may include a third media content item, and the second media content item and the third media content item may be associated with different geographic regions. For example, the second media content file 260 and the third media content file 270 may be associated with different geographic regions, as described with reference to FIG. 2.

In a particular embodiment, the method 400 includes receiving a request for the second media content item from a client device, selecting a third media content item based on user information associated with the client device, and providing the third media content item to the client device. For example, the media content provider system 102 may receive the request 160 from the client device 120. In response to the request 160, the media content provider system 102 may select the third media content item 164 based on the user information 110. For example, the third media content item 164 may be selected based on a geographic region indicated by the user information 110 matching a geographic region associated with the third media content item 164, as a non-limiting example. The media content provider system 102 may provide the third media content item 164 to the client device 120. In a particular embodiment, the user information includes geographic information, demographic information, purchasing information, or a combination thereof. In another particular embodiment, selecting the third media content item includes sending a content identification request to an advertising decision server based on receiving the request. The content identification request may include an identifier of the client device. For example, the CDN node 306 may send the content identification request 320 to the advertising decision server 310. Selecting the third media content item also includes receiving an indication of the third media content item from the advertising decision server in response to sending the content identification request. For example, the CDN node 306 may receive the content indication 322 in response to sending the content identification request 320.

In a particular embodiment, the second portion may further include media data of a third media content item that is different than the first media content item and the second media content item. For example, in some embodiments, the second fragment 216 (e.g., the second portion 146) may include the second mdat portion 226 of FIG. 2. The second mdat portion 226 may be different than the first mdat portion 214 and the second media content file 260. For example, the second mdat portion 226 may correspond to a "default" advertisement, as described with reference to FIG. 2.

In a particular embodiment, the media content file may include a third portion that includes second media data of the media stream. The first portion may further include a first movie fragment header and a first track fragment header, and the third portion of the media content file may further include a second movie fragment header and a second track fragment header. For example, the media content file 200 may include the third fragment 228 that includes the third mdat portion 236. The first fragment 206 may include the first mfhd box 210 and the first trafbox 212, and the second fragment 216 may include the second mfhd box 220 and the second trafbox 222. In another particular embodiment, the media content file may include a fourth portion that includes metadata associated with the media content file. The fourth portion may further include a second indicator that indicates a location of a directory that includes the second media content item. For example, the media content file 200 may include the movie metadata 238. The movie metadata 238 may include the second URL 246 that indicates a location of the directory 250.

Figure 5:
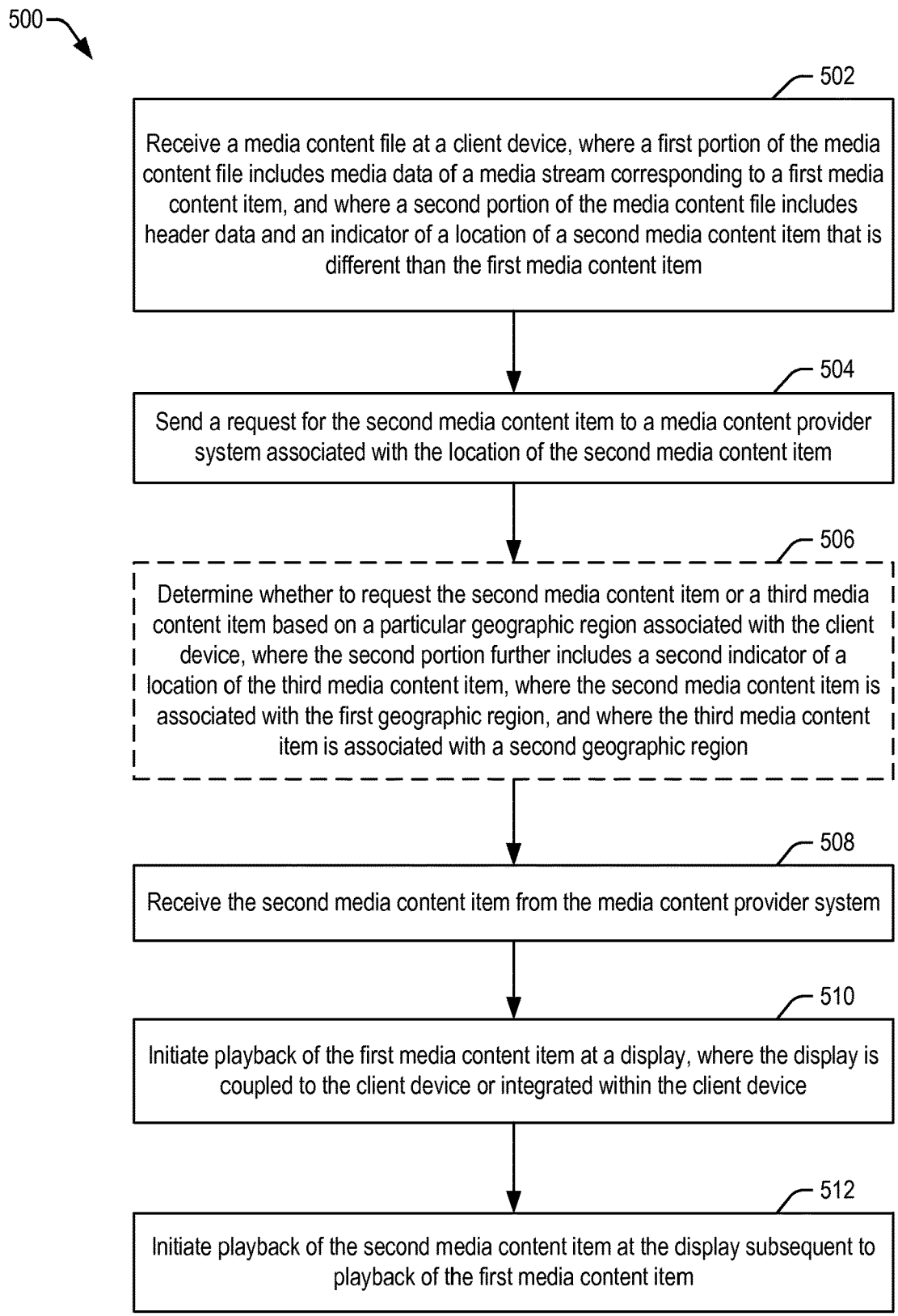
FIG. 5 is a flowchart of an illustrative embodiment of a method of receiving a media content file including media data of a first media content item and an indicator of a second media content item.

Referring to FIG. 5, a particular illustrative example of a method of receiving a media content file including media data of a first media content item and an indicator of a second media content item is depicted and generally designated 500. The method 500 may be performed at one or more devices of a content delivery network (CDN) of a media content provider. As an illustrative, non-limiting example, the method 500 may be performed by the client device 120 of FIGS. 1 and 3.

The method 500 may include receiving a media content file at a client device, at 502. A first portion of the media content file may include media data of a media stream corresponding to a first media content item, and a second portion of the media content file may include header data and an indicator of a location of a second media content item that is different than the first media content item. For example, the client device 120 may receive the media content file 140. The media content file 140 may include the first portion 142 that includes the media data 144 (e.g., media data associated with a first media content item). The media content file 140 may also include the second portion 146 that includes the header data 148 and the indicator 150. The first media content item may include program content, and the second media content item may include advertising content. The indicator may include a uniform resource locator (URL). For example, the indicator 150 may include or correspond to the URL 224 of FIG. 2. In a particular embodiment, the media content file has an International Organization for Standardization base media file format (ISO-BMFF). In another particular embodiment, the media content file has a protected interoperable file format (PIFF). The method 500 may further include sending a request for the second media content item to a media content provider system associated with the location of the second media content item, at 504. For example, the client device 120 may send the request 160 to the media content provider system 102. The request 160 may be sent based on the indicator 150.

In a particular embodiment, the method 500 includes receiving the second media content item from the media content provider system, initiating playback of the first media content item at a display, and initiating playback of the second media content item at the display subsequent to completion of playback of the first media content item. The display may be coupled to the client device or integrated within the client device. For example, the client device may receive the second media content item 162. The client device 120 may initiate playback of the first media content item and, subsequent to completion of playback of the first media content item, the client device 120 may initiate playback of the second media content item 162. Playback may be initiated at a display coupled to, or integrated within, the client device 120.

In a particular embodiment, the second portion further includes a second indicator of a location of a third media content item. The second media content item may associated with a first geographic region, the third media content item may be associated with a second geographic region, and the method 500 may further include determining whether to request the second media content item or the third media content item based on a particular geographic region associated with the client device. For example, the client device 120 may be configured to determine whether to request the second media content item 162 or the third media content item 164 based on whether geographic regions associated with the second media content item 162 and the third media content item 164 match a geographic region associated with the client device 120, as described with reference to FIG. 1.

In a particular embodiment, the method 500 includes receiving a third media content item in response to sending the request for the second media content item. The second media content item and the third media content item may be associated with advertisements for the same advertiser. For example, the client device 120 may receive the third media content item 164. The third media content item 164 may be selected by the media content provider system 102 during performance of dynamic content insertion, as described with reference to FIGS. 1 and 3.

Figure 6:
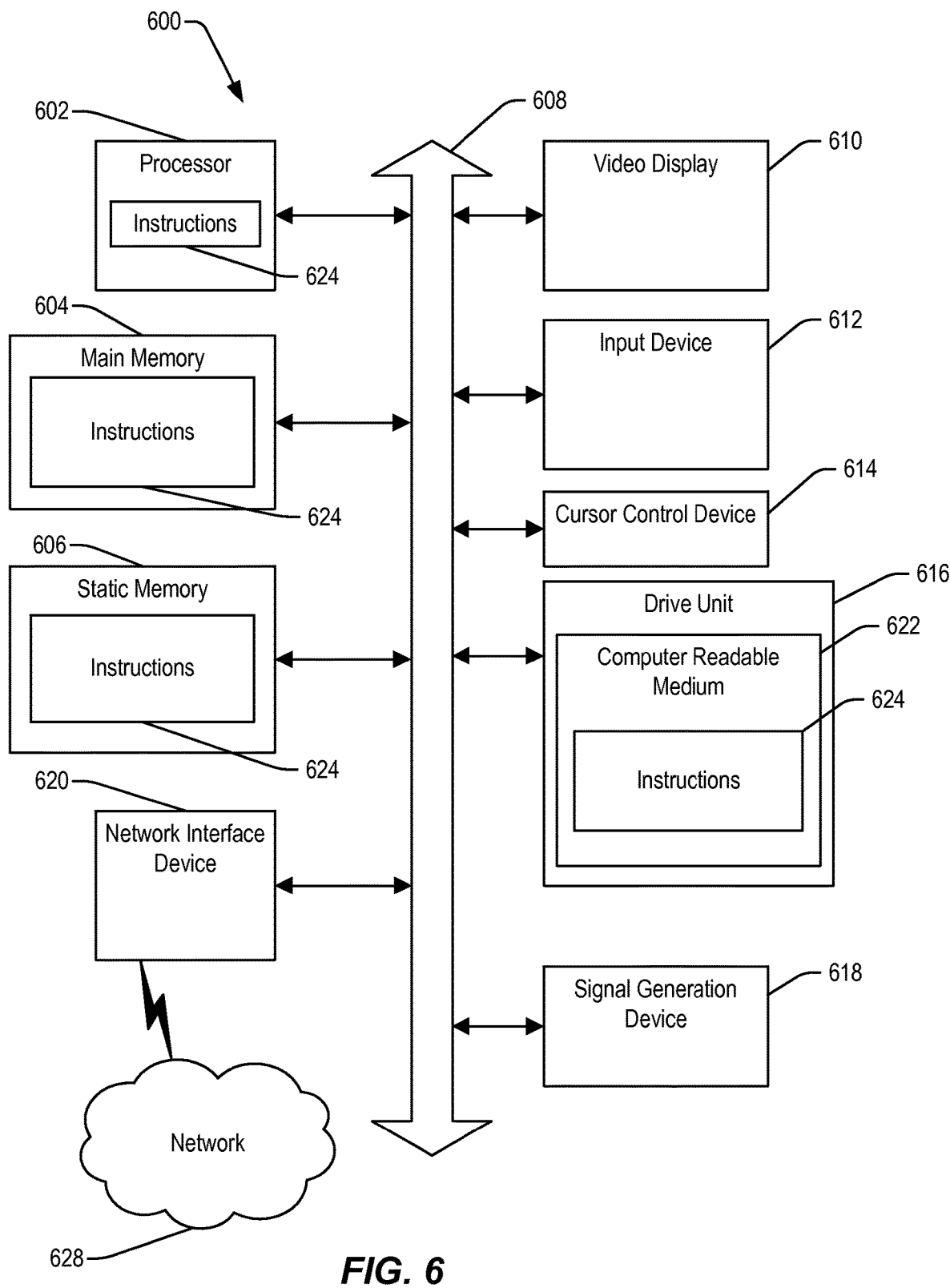
FIG. 6 is a block diagram of an illustrative embodiment of a computer system supporting various aspects of method(s), system(s), apparatus(es), and/or computer-readable media disclosed herein.

Referring to FIG. 6, an illustrative embodiment of a computer system is shown and is designated 600. The computer system 600 includes a set of instructions that can be executed to cause the computer system 600 to perform any one or more of the methods or computer based functions disclosed herein. The computer system 600 may operate as a standalone device or may be connected, e.g., using a network, to other computer systems or peripheral devices. For example, the computer system 600 may include or be included within any one or more of the media content provider system 102 and the CDN node 306 described with reference to FIGS. 1 and 3. As another example, the computer system 600 may include or be included within the client device 120 described with reference to FIGS. 1 and 3.

In a networked deployment, the computer system 600 may operate in the capacity of a server or as a client user computer in a server-client user network environment, or as a peer computer system in a peer-to-peer (or distributed) network environment. The computer system 600 may also be implemented as or incorporated into various devices, such as a mobile device, a palmtop computer, a laptop computer, a desktop computer, a communications device, a wireless telephone, a personal computer (PC), a tablet PC, a personal digital assistant (PDA), a set-top box (STB), a customer premises equipment device, an endpoint device, a web appliance, or any other machine capable of executing a set of instructions (sequential or otherwise) that specify actions to be taken by that machine. In a particular embodiment, the computer system 600 may be implemented using electronic devices that provide video, audio, or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or both. For example, the processor 602 may include or correspond to the processor 104 of the media content provider system 102 of FIG. 1. As another example, the processor 602 may correspond to a processor of the client device 120 of FIG. 1. Moreover, the computer system 600 may include a main memory 604 and a static memory 606, which can communicate with each other via a bus 608. For example, the main memory 604 may include or correspond to the memory 106 of the media content provider system 102 of FIG. 1. As another example, the main memory 604 may correspond to a memory of the client device 120 of FIG. 1.

As shown, the computer system 600 may further include a video display unit 610, such as a liquid crystal display (LCD), a light emitting diode (LED) display, a touch screen display, a flat panel display, a solid state display, or a lamp assembly of a projection system. Additionally, the computer system 600 may include an input device 612, such as a remote control device (e.g., a television remote or a set-top box remote) or a keyboard, and a cursor control device 614, such as a mouse. In some embodiments, the input device 612 and the cursor control device 614 may be integrated into a single device, such as a capacitive touch screen input device. The computer system 600 may also include a drive unit 616, a signal generation device 618, such as a speaker or remote control, and a network interface device 620. Some computer systems 600 may not include an input device (e.g., a server may not include an input device).

In a particular embodiment, as depicted in FIG. 6, the drive unit 616 may include a computer-readable storage device 622 in which one or more sets of instructions 624, e.g. software, can be embedded. The computer-readable storage device 622 may be random access memory (RAM), read-only memory (ROM), programmable read-only memory (PROM), erasable PROM (EPROM), electrically erasable PROM (EEPROM), register(s), solid-state memory, hard disk, a removable disk, a compact disc read-only memory (CD-ROM), other optical disk storage, magnetic disk storage, magnetic storage devices, or any other storage device that can be used to store program code in the form of instructions or data and that can be accessed by a computer and/or a processor. A computer-readable storage device is not a signal. Further, the instructions 624 may embody one or more of the methods or logic as described herein. The instructions 624 may be executable by the processor 602 to perform one or more functions or methods described herein, such as the methods 400 or 500 described with reference to FIG. 4 or FIG. 5, respectively. In a particular embodiment, the instructions 624 may reside completely, or at least partially, within the main memory 604, the static memory 606, and/or within the processor 602 during execution by the computer system 600. The main memory 604 and the processor 602 also may include a computer-readable storage device.

In a particular embodiment (e.g., when the computer system 600 corresponds to a media content provider system), the instructions 624 may be executable by the processor 602 to access a media stream corresponding to a first media content item. The instructions 624 may be further executable by the processor 602 to generate a media content file based on the media stream and a second media content item that is different than the first media content item. A first portion of the media content file may include media data of the media stream, and a second portion of the media content file may include header data and an indicator of a location of the second media content item.

In another particular embodiment (e.g., when the computer system 600 corresponds to a client device), the instructions 624 may be executable by the processor 602 to receive a media content file at a client device. A first portion of the media content file may include media data of a media stream corresponding to a first media content item. A second portion of the media content file may include header data and an indicator of a location of a second media content item that is different than the first media content item. The instructions 624 may be further executable by the processor 602 to send a request for the second media content item to a media content provider system associated with the location of the second media content item.

In an alternative embodiment, dedicated hardware implementations, such as application specific integrated circuits, programmable logic arrays and other hardware devices, may be constructed to implement one or more of the methods described herein. Various embodiments may include a variety of electronic and computer systems. One or more embodiments described herein may implement functions using two or more specific interconnected hardware modules or devices with related control and data signals that can be communicated between and through the modules, or as portions of an application-specific integrated circuit (ASIC). Accordingly, the present system encompasses software, firmware, and hardware implementations.

In accordance with various embodiments of the present disclosure, the methods described herein may be implemented by software programs executable by a computer system, a processor, or a device, which may include forms of instructions embodied as a state machine implemented with logic components embodied in an ASIC or a field programmable gate array (FPGA) device. Further, in an exemplary, non-limiting embodiment, implementations may include distributed processing, component/object distributed processing, and parallel processing. Alternatively, virtual computer system processing may be constructed to implement one or more of the methods or functionality as described herein. It is further noted that a computing device, such as a processor, a controller, a state machine or other suitable device for executing instructions to perform operations may perform such operations directly or indirectly by way of one or more intermediate devices directed by the computing device.

The present disclosure includes a computer-readable storage device 622 that stores the instructions 624 or receives, stores and executes the instructions 624, so that a device connected to a network 628 may communicate voice, video or data over the network 628. While the computer-readable storage device 622 is shown to be a single device, the computer-readable storage device 622 may include a single device or multiple devices, such as a centralized or distributed database, and/or associated caches and servers that store one or more sets of instructions. The computer-readable storage device 622 is capable of storing a set of instructions for execution by a processor to cause a computer system to perform any one or more of the methods or operations disclosed herein. For example, the computer-readable storage device 622 may store instructions for execution by a processor to cause a computer system to perform the method 400 of FIG. 4 or the method 500 of FIG. 5.

In a particular non-limiting, exemplary embodiment, the computer-readable storage device 622 may include a solid-state memory such as embedded memory (or a memory card or other package that houses one or more non-volatile read-only memories). Further, the computer-readable storage device 622 may be a random access memory or other volatile re-writable memory. Additionally, the computer-readable storage device 622 may include a magneto-optical or optical device, such as a disk or tapes or other storage device. Accordingly, the disclosure is considered to include any one or more of a computer-readable storage device and other equivalents and successor devices, in which data or instructions may be stored.

Although the one or more components and functions may be described herein as being implemented with reference to particular standards or protocols, the disclosure is not limited to such standards and protocols. Such standards are from time-to-time superseded by faster or more efficient equivalents having essentially the same functions. Wireless standards for device detection, short-range communications, and long-range communications can be used by the computer system 600 in selected embodiments.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Figures are also merely representational and may not be drawn to scale. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order unless expressly stated. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be implemented as multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, an application specific integrated circuit, and/or a programmable gate array (PGA) including a FPGA. In one or more embodiments, when a processor executes instructions to perform "operations", this can include the processor performing the operations directly and/or facilitating, directing, or cooperating with another device or component to perform the operations.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   updating a first portion of a media content file to include a header and an indicator of a location of a first media content item, wherein the first media content item includes a first advertisement associated with an advertiser, wherein the indicator enables presentation of the first media content item, and wherein the header includes information that indicates: geographic regions associated with the first media content item, age ranges associated with the first media content item, products associated with the first media content item, or any combination thereof;
   after updating the first portion of the media content file, receiving a first request from a client device based on a determination by the client device of a first condition of a network and a second condition of the client device, wherein the first condition includes an available bandwidth of the network and the second condition includes an identification of available processing resources at the client device;
   in response to receiving the first request from the client device, sending a version of a manifest that includes an entry associated with the media content file to the client device;
   after sending the version of the manifest to the client device, receiving a second request from the client device for the first media content item in accordance with the client device determining to request the first media content item based on the information included in the header and based on user information associated with a user of the client device; and
   subsequent to the receiving of the second request from the client device, causing the first media content item to be transmitted to the client device and causing a second media content item to be transmitted to the client device, wherein the second media content item is selected for transmission to the client device based on the second media content item including a second advertisement associated with the advertiser, and wherein the first advertisement is a first version of an advertisement for a product and the second advertisement is a second version of the advertisement for the product that is different from the first version.

2. The method of claim 1, wherein the information included in the header indicates the geographic regions, the age ranges, and the products.

3. The method of claim 1, wherein the first portion of the media content file indicates a duration of the first media content item, a bit rate associated with the first media content item, a codec used to encode the first media content item, or any combination thereof.

4. The method of claim 1, wherein the indicator comprises a uniform resource locator.

5. The method of claim 1, wherein the indicator comprises a uniform resource locator that indicates a location of a second media content file that contains the first media content item, and wherein the second media content file has an International Organization for Standardization base media file format.

6. The method of claim 1, wherein the indicator comprises a uniform resource locator that indicates a partial file name of a second media content file, and wherein the second media content file is stored in a directory that includes additional media content items associated with the advertiser.

7. The method of claim 6, wherein the first media content item and the second media content item are associated with different geographic regions.

8. The method of claim 1, further comprising:
   selecting the second media content item based on the user information.

9. The method of claim 8, wherein the user information includes geographic information, demographic information, purchasing information, or any combination thereof, and wherein the selecting the second media content item comprises:

sending a content identification request to an advertising decision server based on receiving the second request, wherein the content identification request includes an identifier of the client device; and receiving an indication of the second media content item from the advertising decision server in response to sending the content identification request.

10. The method of claim 1, wherein the first portion further includes media data of the second media content item that is different than the first media content item.

11. The method of claim 1, further comprising receiving a media stream from a content provider server at a transcoder of a media content provider system.

12. The method of claim 1, wherein the first request is received from the client device to enable adaptive bitrate (ABR) streaming of content to the client device.

13. The method of claim 1, wherein the client device determines the first condition of the network based on a measurement.

14. An apparatus comprising:
a processor; and
a memory accessible to the processor, the memory comprising instructions executable by the processor to perform or initiate operations comprising:
updating a first portion of a content file to include a header and an indicator of a location of a first content item, wherein the first content item includes a first advertisement associated with an advertiser, wherein the indicator enables presentation of the first content item after presentation of content corresponding to media data, and wherein the header includes information that indicates geographic regions associated with the first content item, age ranges associated with the first content item, products associated with the first content item, or any combination thereof;
after updating the first portion of the content file, receiving a first request from a client device based on a determination by the client device of a first condition of a network and a second condition of the client device, wherein the first condition includes an available bandwidth of the network and the second condition includes an identification of available processing resources at the client device;
in response to receiving the first request from the client device, sending a version of a manifest that includes an entry associated with the content file to the client device;
after sending the version of the manifest to the client device, receiving a second request from the client device for the first content item in accordance with the client device determining to request the first content item based on the information included in the header and based on user information associated with a user of the client device; and
subsequent to the receiving of the second request from the client device, causing the first content item to be transmitted to the client device and causing a second content item to be transmitted to the client device, wherein the second content item is selected for transmission to the client device based on the second content item including a second advertisement associated with the advertiser, and wherein the first advertisement is a first version of an advertisement for a product and the second advertisement is a second version of the advertisement for the product that is different from the first version.

15. The apparatus of claim 14, wherein the media data is included in a media stream, wherein the content file includes a second portion that includes second media data of the media stream, and wherein the second portion of the content file further includes a movie fragment header and a track fragment header.

16. The apparatus of claim 15, wherein the content file includes a third portion that includes metadata, and wherein the third portion further includes a second indicator that indicates a location of a directory that includes the first content item.

17. A method comprising:
receiving, at a client device, a version of a manifest that includes an entry associated with each of a plurality of content files for a first content item, wherein the receiving of the version of the manifest is based on a determination by the client device of a first condition of a network and a second condition of the client device, wherein the first condition includes an available bandwidth of the network and the second condition includes an identification of available processing resources at the client device;
based on the version of the manifest, sending, from the client device, a first request for a content file included in the plurality of content files;
after sending the first request, receiving the content file at the client device, wherein a first portion of the content file includes a portion of data of the first content item, wherein a second portion of the content file includes a header and an indicator of a location of a second content item that is different than the first content item, and wherein the header includes information that indicates: geographic regions associated with the second content item, age ranges associated with the second content item, products associated with the second content item, or any combination thereof;
after receiving the content file, determining by the client device to send a second request for the second content item based on the information included in the header and based on user information associated with a user of the client device;
transmitting the second request for the second content item from the client device subsequent to the determining by the client device to send the second request for the second content item, the second request based on the indicator of the location from the content file; and
subsequent to the transmitting of the second request, receiving the second content item and a third content item at the client device, wherein the second content item includes a first advertisement associated with an advertiser, wherein the third content item is received based on the third content item including a second advertisement associated with the advertiser, and wherein the first advertisement is a first version of an advertisement for a product and the second advertisement is a second version of the advertisement for the product that is different from the first version.

18. The method of claim 17, further comprising:
initiating playback of the first content item at a display, wherein the display is coupled to the client device or integrated within the client device; and
initiating playback of the second content item at the display subsequent to completion of playback of the first content item.

19. The method of claim 17, wherein the second portion further includes a second indicator of a location of the third content item, wherein the second content item is associated with a first geographic region, and wherein the third content item is associated with a second geographic region.

20. The method of claim 17, wherein the second content item includes first program content and the third content item includes second program content that is different from the first program content.

* * * * *